United States Patent [19]

Bragg

[11] 4,194,867
[45] Mar. 25, 1980

[54] AN APPARATUS WITH A TRANSVERSING HOIST LOADER ASSEMBLY

[76] Inventor: Charles G. Bragg, 158 Whiteley Dr., Corpus Christi, Tex. 78418

[21] Appl. No.: 581,551

[22] Filed: May 28, 1975

[51] Int. Cl.² ............................................. B60P 1/46
[52] U.S. Cl. .................................. 414/542; 212/18; 212/141; 414/467
[58] Field of Search ............... 214/75 R, 75 G, 75 H, 214/660, 670–674; 212/14, 18, 124, 140; 414/467, 475, 477, 486, 542

[56] References Cited

U.S. PATENT DOCUMENTS

| 2,730,249 | 1/1956 | Edwards | 214/75 H |
|---|---|---|---|
| 2,746,619 | 5/1956 | Kuhlenschmidt et al. | 214/75 H |
| 2,751,095 | 6/1956 | Hoverstick et al. | 214/75 H |
| 3,098,574 | 7/1963 | DeMarco | 214/674 |
| 3,154,025 | 10/1964 | Worthington | 214/75 H X |
| 3,295,881 | 1/1967 | Worthington | 214/75 H |
| 3,482,715 | 12/1969 | Worthington | 214/75 H |

*Primary Examiner*—Stephen G. Kunin
*Assistant Examiner*—R. B. Johnson
*Attorney, Agent, or Firm*—John Paul Robinson, Jr.

[57] ABSTRACT

A traversing hoist mechanism driven by a vehicle prime mover is drivingly interconnected with a fluid power drive transmission comprising a pump which is drivingly connected to a pair of fixed displacement hydraulic motors connected in a series arrangement for driving the pumps at the same speed; whereby the fluid power drive transmission effectively moves the hoist trolley assembly fore and aft in addition to raising and lowering a lifting apparatus. A unique control line assembly allows the operator to have complete control of the fluid power drive transmission even while standing on ground level adjacent the rear of the vehicle or at any point along at least one side-wall of the cargo area, thereby permitting greater flexibility of control.

6 Claims, 3 Drawing Figures

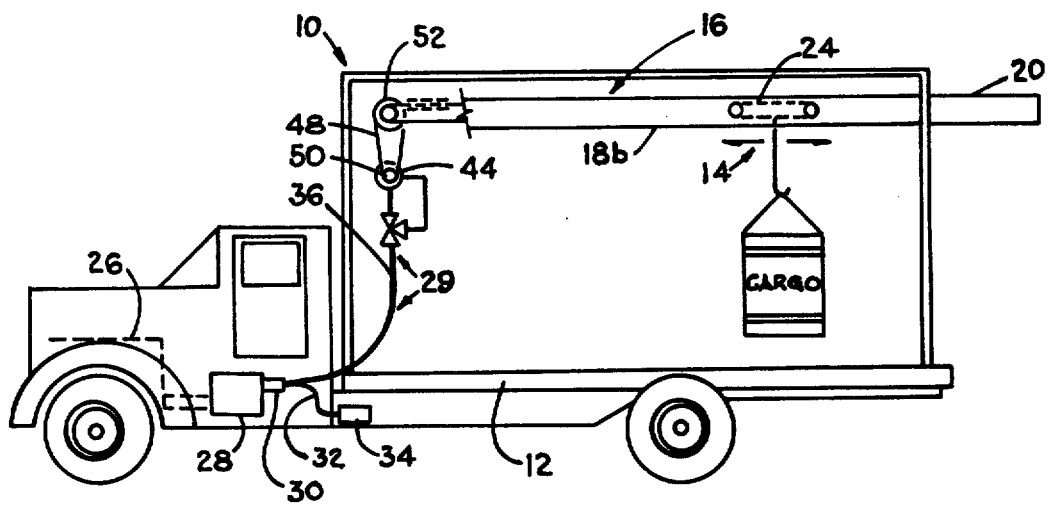
FIG. I
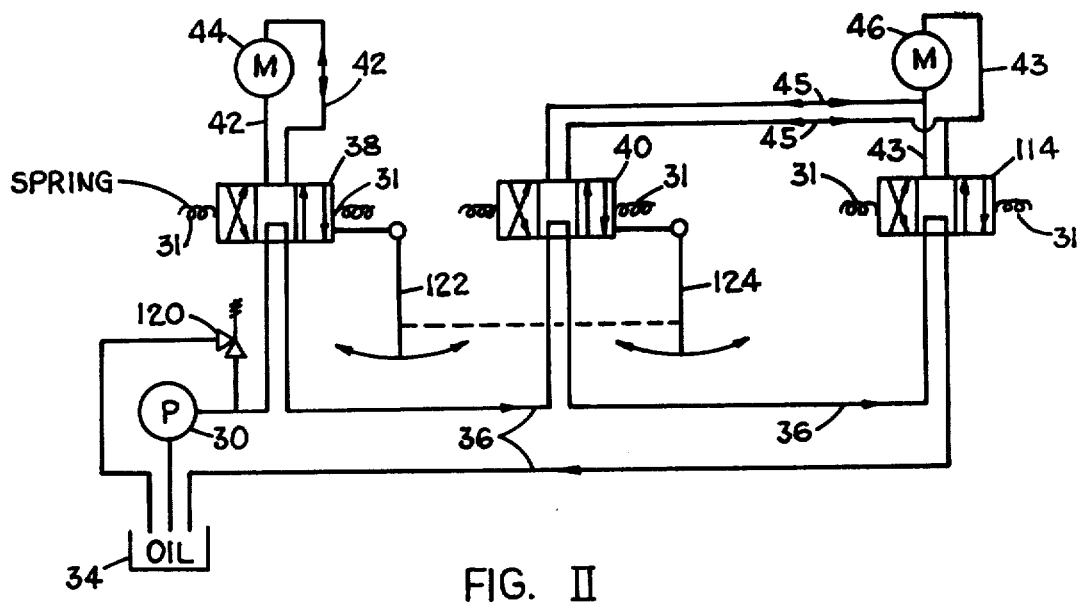
FIG. II

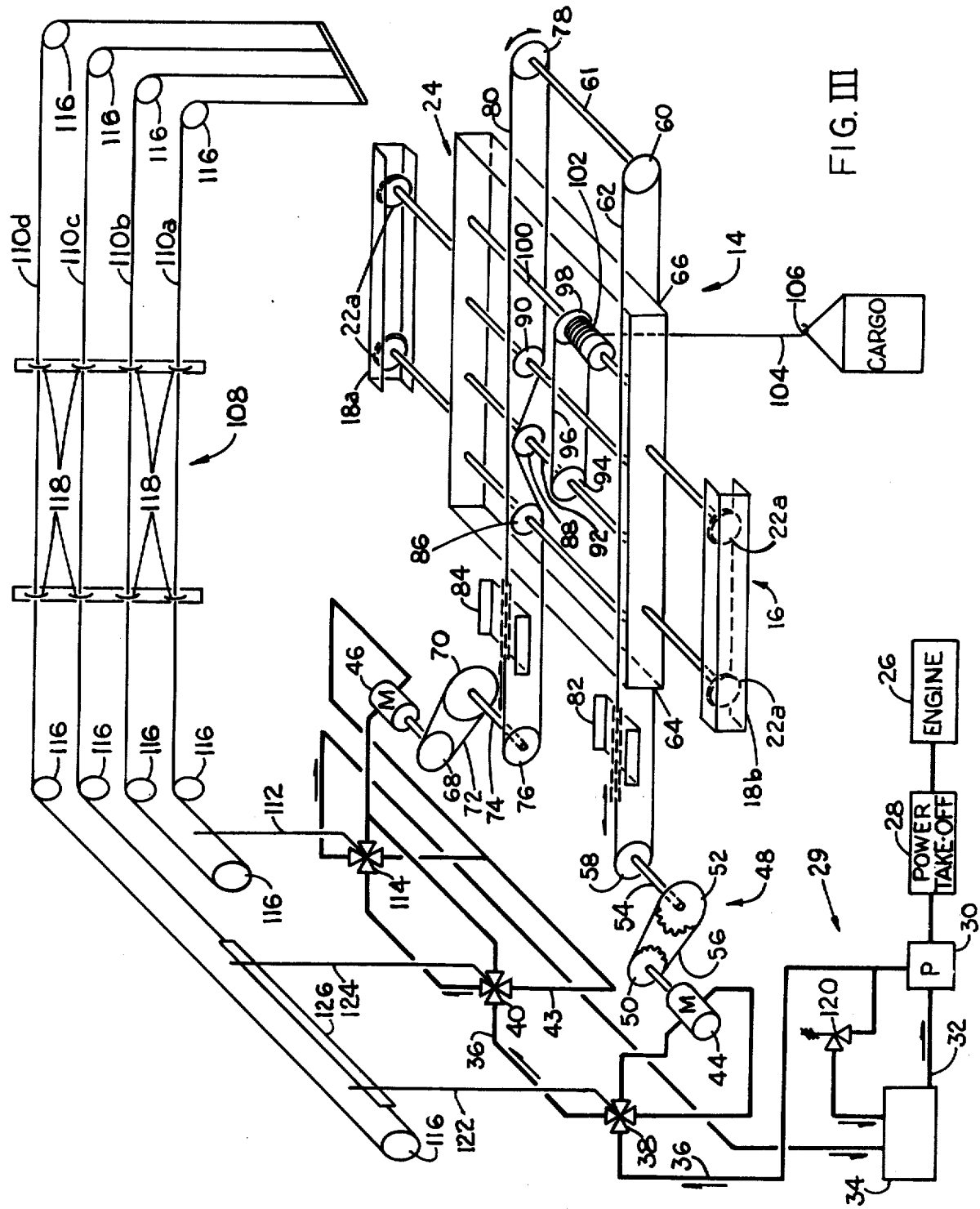

AN APPARATUS WITH A TRANSVERSING HOIST LOADER ASSEMBLY

SUMMARY OF THE INVENTION

This invention relates to a traversing hoist mechanism that is powered by a fluid power drive transmission comprising a pump and two fixed displacement motors in series hookup and including an unusual control arrangement which is especially suited for use in cargo areas found in aircraft, ships, trucks and other vehicles adapted to travel on land, sea, and in the air. In addition, the hoist mechanism can be used in a conventional warehouse.

The following representative art was garnered in a search of the U.S. Patent Office: (1) U.S. Pat. No. 2,403,095 to W. P. Lear; (2) U.S. Pat. No. 2,833,428 to M. Smith; (3) U.S. Pat. No. 3,154,025 to W. H. Worthington; and (4) U.S. Pat. No. 3,295,881 to S. W. Worthington.

In the past, numerous and extensive efforts have been expended to develop a satisfactory, simple, light in weight, easily assembled, rugged and reliable mobile cargo handling device for loading and unloading trucks and other types of cargo carrying vehicles. Some of the present day hoist mechanisms employ at least two rotating drums driven by an electric motor. One drum being a hoisting drum which either winds up or pays out cable to raise or lower a hoisting hook. The other drum is known as a traversing drum that either pays out cable or winds up cable to move a trolley which carries a hoisting device fore and aft. In this particular type of hoisting assembly an electric motor drives the hoisting and traversing drums simultaneously by means of an electromagnetic clutch which selectively interconnects portions of a main drive shaft; or the electric motor can selectively drive only the hoisting drum alone. Said main drive shaft in addition to the electromagnetic clutch usually has a brake unit connected thereto which in turn is connected to a torque limiting and speed controlling unit. Other conventional hoist mechanisms employ a worm gear assembly which functions as a self-locking device for holding the hoisting trolley stationary at any position along the trolley rail. The aforementioned hoist mechanism usually require separate clutch and braking devices; and additionally require separate torque limiting and speed controlling units. The above mentioned devices have many disadvantages, such as they are inefficient, require continuous maintenance, are costly and frequent breakdowns occur causing a substantial loss in production. Thus, it is obvious, in view of the above enumerated deficiencies, that a satisfactory solution has not been previously discovered.

Accordingly, a major object of the present invention is the provision of a new and improved traversing hoist mechanism driven by a fluid power drive transmission which includes a pair of fixed displacement hydraulic motors used in a series hookup, which is reliable in operation, simple to fabricate, and has unique control means arranged to allow an operator to control the traversing hoist mechanism from any position along one side-wall of the cargo carrying area.

Another object of the present invention is to provide a hoist mechanism which is inexpensive to operate and is economical to construct and maintain.

A further object of the present invention is to provide a hoist mechanism assembly which because of its simplicity and reliability of operation increases productivity, and operation is almost effortless; response to control signals is immediate and positive, and even an unskilled person can master its operation in a very short period of time.

A still further object of the invention is to provide a hoist mechanism assembly that is simple to control, no clutch mechanism is required and no gear changing is required during operation; a simple control assembly provides up and down, and fore and aft movements, and the hydrostatic transmission provides dynamic braking, also rapid reversals of direction can be made without damage to the drive train mechanism.

An additional object of the present invention is to provide a hoist mechanism with maneuverability which is greatly improved over conventional systems, whereby greatly increased loads can be moved from a standing start, and there is no surge or speed change when loads are suddenly released and constant speeds can be readily maintained.

A still further object of the present invention is to provide a hoist assembly which is easy to handle and operate and substantially all of the major maintenance problems have been eliminated, thereby dramatically increasing productivity.

Other objects and purposes of the subject invention will be apparent to persons acquainted with traversing hoist mechanisms of this general type upon reading the following specification in conjunction with the accompanying drawing.

In the drawing:

FIG. I is a side elevation, partially in section, of a representative cargo-carrying vehicle with which the present inventive concept can be utilized.

FIG. II is a schematic diagram of the hydraulic piping and control system.

FIG. III is a schematic oblique view of the traversing hoist assembly showing the operative inter-relationship of the several parts of the present inventive concept.

Certain terminology will be used in the following description for convenience in reference only and will not be limiting. The words "upwardly", "downwardly", "rightwardly", and "leftwardly" will designate directions in the drawing in which reference is made. The words "fore" and "aft" or "inwardly" and "outwardly" will refer to directions toward and away from, respectively, the geometric center of the mobile loading assembly and designated parts thereof. Said terminology will include the words above specifically mentioned, derivatives thereof and words of similar import. Further, it will be understood that the following description of the mobile loader and operation of certain portions thereof, has been selected for illustrative purposes only as a convenient and appropriate means for acquainting those skilled in the art with the present invention.

It is to be noted all arrows on the drawing indicate the direction of rotation, motion or travel of the individual portions or elements of the present inventive concept.

Referring in greater detail to the drawing wherein like numerals indicate similar parts throughout the several views, reference number 10 of FIG. 1 designates a conventional land-type vehicle, truck, flat-bed, or van having a chassis and/or structural means 12 defining a cargo or load-carrying area, where material being handled can be stored and carried during transit thereof. This cargo carrying area can be totally enclosed or can be defined by only a bottom-wall, as example, a flat-bed vehicle. While the vehicle illustrated in FIG. 1 is one which is adapted to travel over land, it is apparent other types of vehicles which travel through the air or on the seas can utilize applicant's present inventive concept.

The cargo carrying area is provided with a mobile overhead hoist assembly means 14, FIGS. I and II, which is adapted to move forwardly and rearwardly along substantially the longitudinal axis of the load-carrying area. An elongate track means 16 composed of two spaced apart, opposed structural channels 18a and 18b extend substantially the entire length of the cargo-carrying area and a portion 20 of track means 16 extends outwardly behind and beyond the cargo carrying area to facilitate loading and unloading of the cargo or material being handled. The lower flanges on channels 18a, 18b provide tracks for rollers 22a, 22b journaled for rotation relative to carriage assembly 24. An economical source of energy or power for the new and unobvious hoist assembly is derived from the vehicle's engine 26 through a conventional power-take-off unit 28 which is drivingly connected to the vehicle's transmission which in turn is drivingly connected through conventional linkage to a fluid power drive transmission 29 that includes a positive displacement pump 30. The suction 32 of pump 30 is connected to and communicates with the interior of hydraulic oil reservoir 34. Oil discharged from pump 30 flows through conduit 36, four-way tandem center valves 38, 40, (FIG. III) conduits 42, 43 which then drives two slow speed/high torque fixed displacement hydraulic motors 44, 46 when needed to drive carriage assembly 24 fore or aft relative to the cargo area. The output shaft of hydraulic motor 44 has a chain drive assembly 48 connected thereto, for example, a sprocket 50 is keyed for rotation with said output shaft; and sprocket 50 is aligned in the same vertical plane with sprocket 52 which is fixedly mounted on one end of rotatable shaft 54 for rotation therewith. These two sprockets 50, 52 are interconnected by continuous drive chain 56 and a speed reduction is incorporated in chain drive assembly 48 by varying the pitch diameter of sprockets 50, 52 and/or by varying the number of teeth thereon. The opposite end of rotatable shaft 54 has sprocket 58 keyed thereto for rotation therewith. The rotatable shaft 54 is mounted for rotation by well known bearing means, such as, flange bearings on a suitable structural member which can be a portion of the vehicle van or can be a separate structural member erected for that specific purpose. Sprocket 58 is aligned and drivingly interconnected with sprocket 60, which is rotatably mounted on shaft 61, by a drive chain 62 that has opposite ends thereof connected at 64 and 66 to carriage assembly 24. Thus, it is apparent that rotation of hydraulic motor 44 in a clockwise or counterclockwise angular direction will effectively move carriage assembly 24 in a backwardly or forwardly direction relative to the cargo area. In a similar manner, sprocket 68 is fixedly secured to the output shaft of hydraulic motor 46 and is aligned in the same vertical plane and drivingly connected with sprocket 70 by continuous driving chain 72. Sprocket 70 is keyed to one end of rotatable shaft 74 and sprocket 76 is fixedly secured to the opposite end of rotatable shaft 74 for rotation therewith at the same angular velocity. Sprocket 76 is aligned and drivingly connected with sprocket 78 which is rotatably mounted on shaft 61, by a continuous drive chain 80. It should be noted that chain 62 and 80 each have a guide element 82, 84 respectively, which extend coextensively with drive chain 62, 70. If desired, a lower guide member (not shown) can be provided for chain 62, 80. The lower portion of chain 80 runs on the underside of rotatable idler sprocket 86, over the top portion of rotatable drive sprocket 88 and on the underside of rotatable idler sprocket 90. Drive sprocket 88 is fixedly secured to rotatable shaft 92 for rotation therewith. Sprocket 94 is fixedly secured to rotatable shaft 92 and is axially spaced from sprocket 88. A continuous drive chain 96 drivingly interconnects sprocket 94 with sprocket 98 and sprocket 98 is fixedly secured to rotatable shaft 100 upon which is fixedly secured cable spool 102. Cable 104 is wound upon spool 102 and has a hook or some other conventional type of cargo attachment or grappling device 106 secured to one end thereof.

A control assembly 108 consisting of a plurality of lines 110 a, b, c, d can be manually actuated by the operator. The lines 110 a, b are attached to lever 112 which controls the position of valve 114 (FIG. III). Valve 114 allows the operator to independently actuate hydraulic motor 46 only; thereby causing the rotation of sprocket 88 that drives sprocket 94 which drives chain 96 thereby driving sprocket 98 that effects rotation of cable spool 102 in one or another angular direction to raise or lower the cargo grappling hook 106 to effectively raise or lower the cargo being handled. Several pulleys 116 guide control lines 110 a, b, c, d along the side-walls of the cargo carrying area; in addition, these lines are guided by eyelets 118 mounted on said sidewalls. These control lines 110 a, b, c, d are secured to the vehicle bed adjacent the ground whereby an operator can operate the hoist mechanism while standing on the ground.

Operation of the traversing hoist is accomplished by and operator starting the vehicle engine. If desired, a throttle control mechanism (not shown) can be attached to the engine whereby the operator can regulate the speed of the engine. The operator engages the power take-off to rotate the drive shaft of pump 30. Pump 30 will then discharge hydraulic fluid through line 36. Since fourway tandem center valves 38, 40 and 114 (FIG. III) are spring biased in neutral position the fluid is immediately recirculated to reservoir 34 and hydraulic motors 44, 46 are inoperative. The operator can pull control line 110 c or 110 d which simultaneously moves levers 122, 124 interconnected by a rigid bar member 126, thereby moving valves 38, 40 to one of two flow positions, as illustrated in FIG. III for activating hydraulic motors 44, 46. The hydraulic fluid flows from pump 30 through valves 38, 40 into and through hydraulic motors 44, 46 which effectively drive chains 62, 80 at the same linear speed either fore or aft as desired. Since drive chains 62, 80 move at the same speed the load being handled on grappler means 106 will remain at the same elevation and will not move up or down, but will only move fore or aft with carriage 24. When the operator desires to raise or lower grappler means 106 he releases control cable 110 c or 110 d which permits the spring 31 to bias valves 38, 40 to a neutral position, thereby disengaging motors 44, 46 and this simultaneously locks the carriage assembly 24 in a stationary position. The operator then pulls control line 110 a or 110 b that moves valve stem lever 112, which in turn moves valve 114 to a position allowing fluid to rotate motor 46, which effects a linear movement of drive chain 80; thereby causing rotation of spool 102 to raise or lower the cargo connected to grapplying means 106. During the time motor 46 is effectively causing the rotation of spool 102, motor 44 is stationary or inoperative; otherwise the operator would be unable to raise or lower grappling means 106 relative to the cargo area.

In applicant's inventive concept a fluid power drive transmission means 29 is driven by a prime mover 26 which can be a diesel, gasoline, or L. P. conventional engine to provide the torque or power required to operate a traversing hoist assembly. The following are some of the basic components which can be used in a fluid power drive transmission assembly, such as: (1) variable displacement pump; (2) fixed displacement pump; (3) variable displacement motor; and (4) fixed displacement motor.

Applicant has elected to employ a fixed or positive displacement pump 30 which is hydraulically connected to and selectively or simultaneously drives two fixed displacment motors 44, 46 which are connected in a series hydraulic circuit. Thus, this combination of a fixed displacement pump 30 driving two series connected fixed displacement motors can be employed to effectively transmit power without altering the speed or horsepower between the engine and the load. This type of transmission assembly 29 is convenient if the power source or prime mover 26 is remote from the load. If desired, the following types of power fluid drive transmissions can also be utilized to raise and lower grappling hook 106, and drive applicant's traversing hoist assembly 14 fore and aft, relative to the cargo area. These other types of fluid power drive transmissions are enumerated as follows: (1) A variable displacement pump connected to a pair of variable displacement motors; (2) A variable displacement pump drivingly connected to a pair of fixed displacement motors; and (3) A fixed displacement pump drivingly connected to a pair of variable displacement motors.

While the invention has been shown, illustrated, described and disclosed in terms of embodiments or modifications which it has assumed in practice, the scope of the invention should not be deemed to be limited by the precise embodiment or modification therein shown, illustrated, described or disclosed; such other embodiments or modifications intended to be reserved especially as they fall within the scope of the claims here appended.

It will further be understood that the "Abstract of the Disclosure" set forth above is intended to provide a non-legal technical statement of the disclosure in compliance with the Rules of Practice of the United States Patent Office, and is not intended to limit the scope of the invention described and claimed herein.

What is desired to be secured and claimed by Letters Patent of the United States is:

1. A traversing hoist assembly, in combination, comprising:
   a prime mover means for providing a source of power;
   a power take-off means drivingly connected to said prime mover means;
   a structural means defining a cargo storage space;
   a rail means suspended from the structural means and extending substantially throughout the cargo storage space;
   a traversing hoist assembly means which includes a hoist carriage means substantially positioned within the cargo storage space with a longitudinal axis and movably disposed on the rail means;
   a fluid power drive transmission means drivingly connected to the power take-off means for moving the hoist carriage means in a fore or aft direction along said longitudinal axis of the cargo space, said hoist carriage means having grappling means for handling material being handled;
   a first sprocket assembly means having at least one sprocket journaled adjacent each end of the rail means;
   a chain means drivingly engaging both of the one sprockets adjacent each end of the rail means, with said chain having opposite end portions fixedly secured to the hoist carriage means;
   a second sprocket assembly means having at least another one sprocket journaled adjacent each end of the rail means;
   a pair of idler sprockets mounted on said hoist carriage means, a third sprocket assembly means including an additional sprocket disposed interjacent said pair of idler sprockets;
   a continuous drive chain means reeved about one idler sprocket, said additional sprocket and the other idler sprocket, said continuous drive chain means also drivingly engaging both of the another one sprocket which is journaled adjacent each end of the rail means;
   a first guide means for substantially continuously guiding the chain means;
   a second guide means for substantially guiding the continuous drive chain means;
   a chain and sprocket assembly means drivingly interconnecting the fluid power drive transmission means with the first sprocket assembly means for moving the hoist carriage means in a fore or aft direction; and
   another chain and sprocket assembly means drivingly interconnecting the fluid power drive transmission means with the second sprocket assembly means for raising or lowering the grappling means.

2. A traversing hoist assembly, in combination, comprising:
   a prime mover means for providing a source of power;
   a power take-off means drivingly connected to said prime mover means;
   a structural means defining a cargo storage space having a longitudinal axis;
   a traversing hoist assembly means disposed substantially within said cargo storage space, said hoist assembly means including a hoist carriage means for movement along the longitudinal axis of the cargo storage space, said hoist carriage means having grappling means for handling material;
   a fluid power drive transmission means drivingly connected to the power take-off means for moving the hoist carriage means in a fore and aft direction along the longitudinal axis of the cargo storage space, said transmission means includes at least two fixed displacement hydraulic motor means connected in a parallel relationship, a hydraulic pump means drivingly connected to the power take-off means, with said pump means having a discharge opening connected in series to both of said hydraulic motor means, a plurality of valve means for controlling said hydraulic motor means, conduit means connecting said plurality of valve means with each other, means for simultaneously actuating said plurality of valve means wherein said conduit means connect said hydraulic motor means in a fluid series relationship, whereby one hydraulic motor means drive said hoist carriage in either a fore or aft direction and the other hydraulic motor means effectively maintains the height of the grappling means relative to the cargo storage space; and said fluid power drive transmission means further including means for selective actuation of only said other hydraulic motor means for raising or lowering the grappling means.

3. The traversing hoist assembly recited in claim 2, wherein said plurality of valve means include:

a four-way tandem center valve means disposed interjacent the hydraulic pump means and the one hydraulic motor means and another four-way tandem center valve positioned between said one hydraulic motor means and the other hydraulic motor means.

4. The traversing hoist assembly recited in claim 2, further including:

at least three valve means for controlling the flow of hydraulic fluid to the hydraulic motor means, one valve means disposed between the hydraulic pump means and the one hydraulic motor means, the other valve means positioned between said one hydraulic motor means and the other hydraulic motor means, the third valve means is disposed between the hydraulic pump means and the other hydraulic motor means.

5. The traversing hoist assembly recited in claim 4, further including:

a manually operable control system means, including valve means positioned between the pump and both hydraulic motors, operable to simultaneously actuate both hydraulic motor means whereby one hydraulic motor means drives the hoist carriage means in a fore or aft direction and the other hydraulic motor means effectively maintains the height of the grappling means relative to the cargo storage space, while actuation of only the other hydraulic motor means raises or lowers the grappling means.

6. The traversing hoist assembly recited in claim 4, wherein:

the three valve means comprise three four-way tandem center valves having spring means biasing said four-way valves to a neutral position.

* * * * *